United States Patent [19]

Cornaire et al.

[11] 4,217,761

[45] Aug. 19, 1980

[54] HEAT PUMP OUTPUT INDICATOR

[76] Inventors: James L. Cornaire, 13 Marilyn Dr., Scotia, N.Y. 12302; Phillip R. Crabbs, Hubbs Rd., R.D. #6, Ballston Lake, N.Y. 12019

[21] Appl. No.: 947,158

[22] Filed: Sep. 28, 1978

[51] Int. Cl.[2] .................... G01K 13/00; G05D 23/00
[52] U.S. Cl. ........................................ 62/130; 236/94; 165/11 R
[58] Field of Search ............... 62/125, 127, 130, 160; 165/11; 236/94; 73/193 R, 112, 339 C

[56] References Cited

U.S. PATENT DOCUMENTS

| 2,305,769 | 12/1942 | Germer | 73/193 |
| 3,499,297 | 3/1970 | Raff et al. | 62/160 |
| 3,707,851 | 1/1973 | McAshan, Jr. | 62/125 |
| 3,913,344 | 10/1975 | Holloway et al. | 62/208 X |

Primary Examiner—William E. Wayner
Assistant Examiner—Harry Tanner
Attorney, Agent, or Firm—Cushman, Darby & Cushman

[57] ABSTRACT

A device for measuring the relative efficiency of a heat pump whose design efficiency increases in proportion to the outdoor temperature. Temperature sensitive diodes connected to a differential amplifier are inserted in the return air stream and supply air stream of a heat pump in order to measure the air temperature increase across the indoor coil. A third temperature sensitive diode connected to a second differential amplifier is placed outdoors in order to measure the outdoor temperature. The outputs of the first two differential amplifiers are combined and then subtracted from a fixed value signal by a third amplifier in order to produce an output which is proportional to the relative efficiency of the heat pump at the outdoor temperature.

18 Claims, 1 Drawing Figure

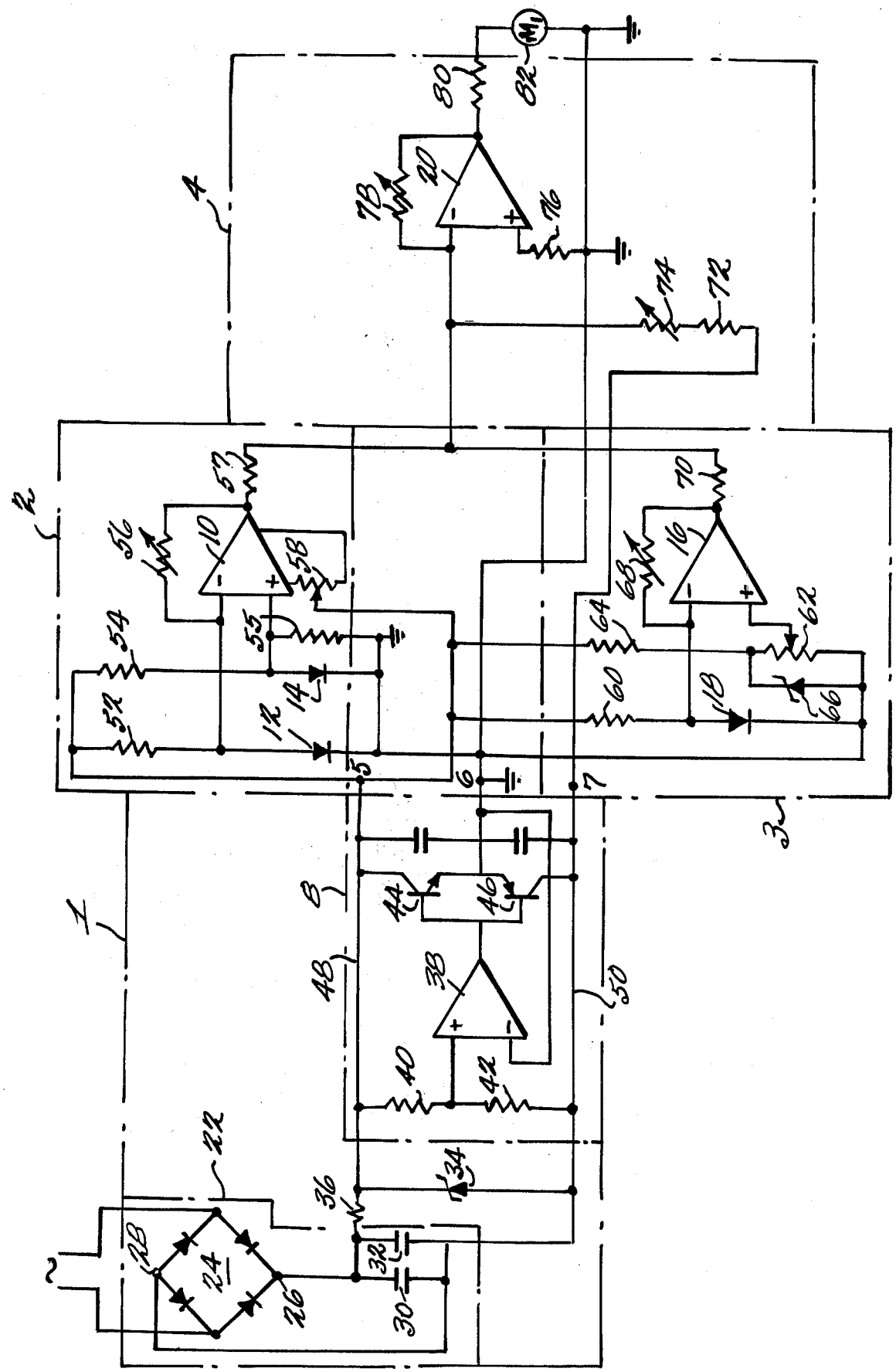

HEAT PUMP OUTPUT INDICATOR

BACKGROUND

The present invention relates to a device for measuring the relative efficiency of operation of a heat pump.

It is a basic principle of the operation of a heat pump that its heat output, and therefore the air temperature rise across its indoor condensor coil, drops as the outdoor temperature drops. As a result, below certain outdoor temperatures, supplemental heaters are ordinarily required to operate along with a heat pump in order to maintain a space being heated at a given temperature. Such supplemental heaters are normally activated to maintain the indoor temperature at a particular level by a mechanism, such as a thermostat, which is independent of the heat pump's operation. If a malfunction in the heat pump should occur, resulting in a reduction in its heat output, the supplemental heaters will be activated to maintain the desired indoor temperature and this will result in unnecessary expense in operating the supplemental heaters.

In order to minimize this expense and prevent heat pump malfunctions from worsening, it is therefore important that all heat pump malfunctions be quickly and easily detected. However, several features of heat pump systems including those discussed above, present a problem in detecting malfunctions of a heat pump. For example, a malfunction cannot be detected merely by observing the room temperature. Nor can a malfunction be detected by observing the output of the heat pump or the operation of the supplemental heater alone, without consideration of the outdoor temperature, since the latter significantly influences the heat pump system output. Furthermore, heat pumps are known to experience several types malfunctions and therefore monitoring only one or two of them will not alert those concerned to all of the various defects or failures which could lower the heat pump output. Such other failures which could cause reduced heat output include, for example, partial loss of refrigerant, malfunction of the indoor and outdoor coil refrigerant feed device, failure of system or control power, and blockage of the outdoor coil by debris.

Previous attempts to monitor the operation of a heat pump have been directed to the detection of particular malfunctions of the heat pump. For example, U.S. Pat. No. 2,054,542 (Hoelle, 1936) discloses a device which indicates abnormal operation of a compressor in a refrigerating machine. U.S. Pat. No. 3,628,346 (Lagrone, 1967) discloses a device for indicating a malfunction in the fan or motor-compressor of a central air conditioning system. However, as indicated above, such devices do not indicate whether some other defect or failure may be causing a reduction in heat pump output.

Other patents show automatic control of heat pump systems and air conditioning systems. For example, U.S. Pat. No. 3,381,489 (Biehn, 1968) shows the use of a thermistor, responsive to the temperature of the outdoor coil of a heat pump, for adjusting the speed of the motor of the fan used for moving outdoor air over the surface of the outdoor coil. U.S. Pat. No. 3,058,724 (Maudlin, 1962) and U.S. Pat. No. 2,672,734 (Ditzler, 1954) disclose heat pump apparatuses which control and indicate the use of auxiliary heaters. However, as indicated above, even with the use of automatic devices for indicating and controlling on supplemental heat, a separate determination must be made as to whether supplemental heat is required at a particular time or whether the heat pump is operating inefficiently.

SUMMARY OF THE INVENTION

The present invention provides a means for obtaining an overall check of the operation of a heat pump by determining if the indoor condensor coil is performing as it was designed to and warning of a failure to produce the heating (or cooling) that should be expected from the system. In this way the invention overcomes the limitations of prior devices which provide a check on only one or two system functions. While a heat pump may operate in either a heating or a cooling mode and the present invention may be calibrated to operate in either, its primary use, and the description herein will be concerned with the heating mode of operation. In the heating mode, the invention operates by continually comparing the air temperature rise created across the indoor condensor coil of the heat pump against the outdoor temperature to determine whether or not the system is producing 100% of its rating at that outdoor temperature. As indicated above, it is a basic principle of the operation of a heat pump that the temperature rise of the air being heated drops as the temperature of the outdoor air drops. It is therefore basic to the design of the efficiency indicator which constitutes the present invention that the indicator allow for these temperature drops in order to produce the correct indications. In one embodiment of the invention, voltages developed across a temperature sensitive diode which is inserted in the return air stream of the air moving equipment of the heat pump and a temperature sensitive diode which is inserted in the supply air stream of the air moving equipment of the heat pump, respectively, are subtracted one from the other in a differential amplifier. Another temperature sensitive diode, located outdoors, is utilized in combination with another differential amplifier to provide a signal which is proportional to the outdoor temperature. The outputs of the two differential amplifiers are appropriately weighted and combined to indicating deviation from the design efficiency of the heat pump at the outdoor temperature. This signal is then subtracted from a fixed value signal in a third differential amplifier to produce a signal which is proportional to the relative efficiency of the system as adjusted for the outdoor temperature. Since the achievable temperature rise of the air being heated by a heat pump is a nearly linear function of the outdoor temperature for most applications (for outdoor temperatures between, −15° F. and 65° F.) the weights may be constant values. A suitable meter is then utilized to provide a visual display of the heat pump's operating efficiency.

In addition to fulfilling the purposes described above, the present invention has the further advantages of being simple in design, inexpensive to manufacture, and resistant to destruction or loss of calibration by tampering or other misuse.

Other advantages of the present invention will become apparent from a consideration of the following specification when read in conjunction with the attached drawing.

BREIF DESCRIPTION OF THE DRAWING AND DESCRIPTION OF THE PREFERRED EMBODIMENT

The FIGURE shows a circuit diagram of the preferred embodiment of the invention.

Referring to the FIGURE, the invention, in its preferred embodiment, can conveniently be divided into four sections: power supply 1, an indoor temperature difference circuit 2, an outdoor temperature circuit 3, and a summation circuit 4.

Power supply 1 rectifies an AC voltage taken off the heat pump power supply and divides the rectified voltage in half, producing constant voltages of +V at the positive output terminal 5, zero at the ground terminal 6 and −V at the negative output terminal 7, using a precision balance circuit 8.

Circuit 2 includes an operational amplifier 10 connected in a differential mode, a temperature sensitive diode 12 located in the return air stream of the heat pump and another temperature sensitive diode 14 located in the supply air stream of the heat pump. These components are suitably connected so as to generate an output which is proportional to the temperature difference between the return air stream and the supply air stream.

Circuit 3, whose primary components are an operational amplifier 16 connected in a differential mode and a temperature sensitive diode 18 located at an outdoor location, is designed to generate an output signal which increases linearly with increasing outdoor temperature.

Circuit 4 sums the outputs of circuits 2 and 3 to produce an output indicating deviation from desired efficiency. Operational amplifier 20 provides an output signal which is proportional to the efficiency of the heat pump being monitored by subtracting from a fixed value signal the combined signal indicating, in effect, deviction from 100% efficiency. The output of Circuit 4 is imputed to a meter or other visual display device.

The rectifier 22 of power circuit 1 may be suitably composed of a bridge rectifier 24 having a positive output terminal 26 and a negative output terminal 28 connected across a smoothing capacitor 30 and a transient voltage surge removal capacitor 32. The positive terminal of bridge rectifier 24 is also connected to the cathode of zener diode 34 through resistor 36 which in combination with zener diode 34 stabilizes the magnitude of the DC voltage supply. It should be noted that any suitable voltage regulator could be utilized in place of the zener diode 34. The non-inverting input terminal of an operational amplifier 38 is connected to the junction of zener diode 34 and resistor 36 through a resistor 40 and is connected to a negative terminal 28 of bridge 24 through a resistor 42 having a value equal to that of resistor 40. The inverting terminal of operational amplifier 38 is connected to the emitter of NPN transistor 44 and the emitter of PNP transistor 46, the bases of which are both connected to the output terminal of operational amplifier 38. The collector of transistor 44 is connected to the junction of resistor 36 and zener diode 34 through positive DC voltage conductor 48. The collector of transistor 46 is connected to a negative terminal of bridge rectifier 24 through negative DC voltage conductor 50.

In operation, circuit 1 provides a constant DC voltage of +V on conductor 48 and −V on conductor 50 as follows. A rectified AC signal from bridge rectifier 24 is smoothed by capacitor 30 and maintained at a constant amplitude of 18 V across zener diode 34 by resistor 36. Assuming initially that the voltage on conductor 48 is +V and the voltage on conductor 50 is −V, if the amplitude of the voltage on conductor 48 begins to exceed the amplitude of the voltage on conductor 50, then the voltage at the non-inverting input terminal of operational amplifier 38 will become positive since resistor 40 and resistor 42 have equal values. Since the inverting input terminal of operational amplifier 38 is grounded, a positive current will appear at the output of operational amplifier 38, thereby causing a positive bias to appear across the base to emitter junction of transistor 44 resulting in a reduction of voltage between the collector and emitter terminals of transistor 44 and therefore a reduction in the voltage between conductor 48 and ground terminal 6. When the voltage on conductor 48 is reduced to a magnitude equal to that on conductor 50, the voltage on the non-inverting terminal of operational amplifier 38 will be reduced to zero and therefore equal to the voltage on the inverting terminal of operational amplifier 38, thereby causing the voltage on the output terminal of operational amplifier 38 to return to zero and turning off transistor 44. Similarly, if the voltage at the non-inverting terminal of operational amplifier 38 should begin to become negative, a negative voltage would appear at the output of operational amplifier 38 turning on transistor 32 and causing the voltage on conductor 36 to become less negative, thereby returning the voltage at the non-inverting input terminal of operational amplifier 24 to zero, causing the output voltage of operational amplifier 24 to return to zero and thereby shut off transistor 46.

Circuit 2, which develops a signal proportional to the temperature across the indoor coil, includes an operational amplifier 10, the inverting input terminal of which is connected to ground through a temperature sensitive diode 12 located in the return air stream of the heat pump, and is connected to positive power supply voltage conductor 48 through return air stream diode biasing resistor 52. The non-inverting input terminal of operational amplifier 10 is connected to ground through temperature sensitive diode 14 located in the supply air stream of the heat pump (below any resistance heaters) and is connected to the positive power supply voltage conductor 48 through supply air stream diode biasing resistor 54. A biasing resistor 55 is connected across supply air stream diode 14. A variable feedback resistor 56 is connected from the output of operational amplifier 10 to the inverting input terminal of operational amplifier 10 so that the gain of operational amplifier 10 may be established during the initial calibration of the device. A current limiting resistor 57 connects the output of operational amplifier 10 to the input of circuit 4 as will be explained. A potentiometer 58, having its wiper connected to positive voltage supply conductor 48, and its resistive element connected across the null-offset terminals of operational amplifier 10, is included so that any internal parameter difference between return air stream diode 12 and supply air stream diode 14 may be offset during initial calibration of the device. In the preferred embodiment, return air stream diode 12 and supply air stream diode 14 are silicon diodes having linear temperature characteristics whereby the junction potential of the diodes decrease by approximately 2 millivolts for each degree Centigrade of temperature increase. Thermistors, although more expensive, may be used in place of the silicon diodes.

In operation, current from positive voltage supply conductor 48 enters the circuit 2 through resistors 52 and 54 which limit the current through diodes 12 and 14, respectively. When the heat pump is operating in its heating mode, the air temperature of the supply air stream will be greater than the air temperature of the return air stream and consequently, the voltage across return air stream diode 12 will be greater than the voltage across supply air stream diode 14 and the difference between these temperatures will therefore be reflected as a negative output from operational amplifier 10.

Circuit 3 of the device, which modifies the efficiency signal according to the outdoor temperature, includes an operational amplifier 16, the inverting input terminal of which is connected to the positive voltage supply conductor 48 through outdoor temperature monitoring diode biasing resistor 60 and is connected to ground through outdoor temperature monitoring diode 18. The non-inverting input terminal of operational amplifier 16 is connected to the wiper of a potentiometer 62. One of the fixed terminals of potentiometer 62 is connected to positive voltage supply conductor 48 through biasing resistor 64 and the other terminal is connected to ground. A zener diode 66 is connected across the fixed terminals of potentiometer 62. Potentiometer 62, biasing resistor 64 and zener diode 66 are a stabilized reference source for the non-inverting input terminal of operational amplifier 16. Variable resistor 68 connected between the output and inverting input terminals of operational amplifier 60 establishes the gain for operational amplifier 60. A current limiting resistor 70 connects the output of operational amplifier 10 to the input of circuit 4 as will be explained.

In operation, the voltage developed across outdoor temperature sensing diode 18 decreases proportionately as the outdoor temperature increases. Therefore, as the outdoor temperature increases, the voltage on the inverting input terminal of operational amplifier 16 decreases and the output of operational amplifier 16 increases proportionately within the limits established by the resistance setting on variable resistor 68 and potentiometer 62.

The circuit 4, which sums and amplifies the outputs from circuits 2 and 3 of the device, includes an operational amplifier 20, the inverting input terminal of which is connected as follows: to the output terminal of operational amplifier 10 through resistor 57, to the output terminal of operational amplifier 16 through a resistor 70, and to negative power supply conductor 50 through a series connected resistor 72 and a variable resistor 74. Resistor 72 and variable resistor 74 are suitably connected to the inverting input terminal of operational amplifier 20 in order to serve as a current potential and to aid in the initial calibration of the device. The non-inverted input terminal of operational amplifier 20 is connected to ground through resistor 76. In order to establish a stable gain for operational amplifier 20, a variable resistor 78 is connected between the output terminal and the inverting input terminal of operational amplifier 20. The output terminal of operationl amplifier 20 is connected to one side of an output resistor 80, the other side of which may be connected to a suitable meter 82 for reading the efficiency of the heat pump.

In operation, the output currents of operational amplifier 10 and operational amplifier 16 are fed respectively through current limiting resistor 57 and current limiting resistor 70 to the inverting input terminal of operational amplifier 20. The output of operational amplifier 20 is fed through resistor 80 to meter 82.

It should be noted that the output of circuit 2 of the circuit is a signal whose magnitude is proportional to the heat output of the heat pump. Since the heat output of the heat pump should increase as the outdoor temperature increases in an approximately linear manner, a negative going current proportional to the outdoor temperature produced by circuit 3 is added to the output current of circuit 2 in order to provide an indication of the system's efficiency. For example, should the outdoor temperature detected by diode 18 increase, without a corresponding increase in the heat output of the heat pump as reflected by the difference in voltages across diodes 12 and 14, the output of operational amplifier 10 would increase causing the output of operational amplifier 20 to drop, properly indicating a reduction in relative efficiency of the heat pump. Similarly, if the outdoor temperature remains constant and the heat pump output drops off, the output of operational amplifier 16 will increase causing the output of operational amplifier 20 to decrease, correctly indicating a reduction in relative efficiency of the heat pump.

It will be recognized that the present invention has a wide range of applicability. For example, if properly calibrated in a different manner, the device may be used to indicate the effectiveness of the air conditioning side of a heat pump or any other air conditioner or refrigeration device. Similarly, it will be recognized that the present invention is susceptible to modification by those skilled in the art to include alternate electrical and non-electrical means for detecting temperature changes and measuring temperature differences.

These and other such modifications and applications of the present invention may be made within the spirit and scope of the invention as defined by the appended claims.

What is claimed is:

1. A device for measuring the operating efficiency relative to its design efficiency at a given outdoor temperature, said heat pump or refrigeration device or air conditioning device having a supply air stream, a return air stream, an indoor coil, and a design efficiency which varies according to the outdoor temperature, comprising:
   first means for generating a first output having a characteristic which is proportional to the air temperature difference across said indoor coil;
   second means for generating a second output having a characteristic which increases and decreases in proportion to changes in the outdoor temperature; and
   means connected to said first and second generating means, for combining said first and second outputs to generate a third output having a characteristic directly proportional to the actual operating efficiency of said heat pump or refrigeration device or air conditioning device relative to the design efficiency of said heat pump or refrigeration device or air conditioning device at said given temperature.

2. The invention described in claim 1 further comprising means, connected to said third output generating means, for displaying said relative efficiency.

3. A device for measuring the relative efficiency of a heat pump having a supply air stream, a return air stream, an indoor coil, and a design efficiency which varies according to the outdoor temperature, comprising:
   means for generating a first electrical signal, the magnitude of which is proportional to the air temperature difference across said indoor coil;
   means for generating a second electrical signal, the magnitude of which increases and decreases in proportion to changes in the outdoor temperature; and means, responsive to said first signal and said second signal, for generating a third electrical signal, the magnitude of which is a function of the magnitude of said first signal and the magnitude of said second signal, such that said third signal has a magnitude directly proportional to the actual operating efficiency of said heat pump relative to the design efficiency of said heat pump at said outdoor given temperature.

4. The invention described in claim 3 further comprising means, responsive to said third electrical signal, for displaying said relative efficiency.

5. The invention described in claim 3 wherein said means for generating said first electrical signal comprises:
a first differential amplifier,
means, operatively connected to one of the input terminals of said first differential amplifier, for generating a fourth electrical signal, the magnitude of which increases and decreases in proportion to changes of the air temperature in said supply air stream; and
means operatively connected to the other input terminal of said first differential amplifier, for generating a fifth electrical signal, the magnitude of which increases and decreases in proportion to changes in air temperature in said return air stream.

6. The invention described in claim 5, wherein:
said means for generating a second electrical signal comprises a second differential amplifier, and a temperature sensitive diode operatively connected to one of the input terminals of said second differential amplifier;
said fourth electrical signal generating means comprises a first temperature sensitive diode; and
said fifth electrical signal generating means comprises a second temperature sensitive diode.

7. The invention described in claim 3 further comprising means, adapted to be connected to the heat pump power supply, for providing a first constant DC voltage to said first and second signal generating means and a second constant voltage to said third signal generating means, said first and said second DC voltages having the same magnitude and opposite polarities.

8. The invention described in claim 7 wherein said constant DC voltage providing means comprises:
a fourth differential amplifier having voltage supply terminals;
a rectifier connected across the voltage supply terminals of said fourth differential amplifier;
a zener diode connected across the voltage supply terminals of said fourth differential amplifier for stabilizing the output voltage of said rectifier; and
two transistors operatively connected across the voltage supply terminals of said fourth differential amplifier, the emitters of said transistors being connected together so that said first and second DC voltages are maintained at the collectors of said transistors.

9. A device for measuring the operating efficiency of a heat pump or refrigeration device or air conditioning device relative to its design efficiency at a given outdoor temperature, said heat pump or refrigeration device or air conditioning device having a supply air stream, a return air stream, an indoor coil, and a design efficiency which varies according to the outdoor temperature, comprising:

first means for generating a first output having a characteristic which increases and decreases in proportion to changes in the air temperature in said supply air stream;
second means for generating a second output having a characteristic which increases and decreases in proportion to changes in the air temperature in said return air stream;
third means for generating a third output having a characteristic which increases and decreases in proportion to changes in the outdoor temperature; and
fourth means, connected to said first, second, and third generating means, for combining said first, second, and third outputs to generate a fourth output having a characteristic directly proportional to the actual operating efficiency of said heat pump or refrigeration device on air conditioning device at said given temperature.

10. The invention described in claim 9 further comprising means, connected to said fourth output generating means, for displaying said relative efficiency.

11. A device for measuring the relative efficiency of a heat pump having a supply air stream, a return air stream, an indoor coil, and a design efficiency which varies according to the outdoor temperature, comprising:
means for generating a first electrical signal whose magnitude increases and decreases in proportion to changes in the air temperature in said supply air stream;
means for generating a second electrical signal whose magnitude increases and decreases in proportion to changes in the air temperature in said return air stream;
means for generating a third electrical signal whose magnitude increases and decreases in proportion to changes in outdoor temperature; and
means, responsive to said first signal, said second signal and said third signal, for generating a fourth electrical signal, the magnitude of which is a function of the magnitudes of said first, second and third signals, the magnitude of said fourth signal being proportional to the actual operating efficiency of said heat pump relative to the design efficiency of said heat pump at said given temperature.

12. The invention described in claim 11, wherein:
said first electrical signal generating means comprises a first temperature sensitive diode;
said second electrical signal generating means comprises a second temperature sensitive diode; and
said means for generating a third electrical signal comprises a third temperature sensitive diode.

13. The invention described in claim 11 further comprising means, responsive to said fourth electrical signal generating means, for displaying said relative efficiency.

14. The invention described in claim 11 further comprising means, adapted to be connected to the heat pump power supply, for providing a first constant DC voltage to said first, second and third signal generating means and a second constant DC voltage to said fourth signal generating means, said constant DC voltage having the same magnitude and opposite polarities.

15. The invention described in claim 14 wherein said constant DC voltage providing means comprises:
a differential amplifier;

a rectifier connected across the voltage supply terminals of said differential amplifier;

a zener diode connected across the voltage supply terminals of said differential amplifier for stabilizing the output voltage of said rectifier;

two transistors operatively connected across the voltage supply terminals of said differential amplifier, the emitters of said transistors being connected together so that said first and second DC voltages are maintained at the collectors of said transistors.

16. A method for measuring the operating efficiency of a heat pump or refrigeration device or air conditioning device relative to its design efficiency at a given outdoor temperature, said heat pump refrigeration device or air conditioning device having a supply air stream, a return air stream, an indoor coil, and a design efficiency which varies according to the outdoor temperature, said method comprising the steps of:

generating a first output, representing the air temperature difference across the indoor coil;

generating a second output, representing the given outdoor temperature; and;

producing, in response to said first output and said second output, a third output having a characteristic directly proportional to the actual operating efficiency of said heat pump or refrigeration device or air conditioning device relative to the design efficiency of said heat pump or refrigeration device or air conditioning device at said given outdoor temperature.

17. A method for measuring the relative efficiency at a given outdoor temperature of a heat pump having a supply air stream, a return air stream, an indoor coil, and a design efficiency which varies according to the outdoor temperature, the method comprising the steps of:

generating a first electrical signal, representing the magnitude of the air temperature difference across said indoor coil;

generating a second electrical signal, representing the magnitude of said given outdoor temperature; and producing in response to said first signal and said second signal, a third electrical signal which is a function of the magnitude of said first signal and the magnitude of said second signal, such that said third signal has a magnitude directly proportional to the actual operating efficiency of said heat pump relative to the design efficiency of said heat pump at said given temperature.

18. A method for measuring the efficiency at a given outdoor temperature of a heat pump having a supply air stream, a return air stream, an indoor heat pump coil, and a design efficiency which varies according to the outdoor temperature, comprising the steps of:

generating a first electrical signal whose magnitude increases and decreases in proportion to changes in the air temperature in said supply air stream;

generating a second electrical signal whose magnitude increases and decreases in proportion to changes in the air temperature in said return air stream;

generating a third electrical signal whose magnitude increases and decreases in proportion to the outdoor temperature; and generating a fourth electrical signal whose magnitude is a function of the magnitudes of said first, second and third signals, the magnitude of said fourth signal being proportional to the actual operating efficiency of said heat pump relative to the design efficiency of said heat pump at said given temperature.

* * * * *